US012179454B2

(12) United States Patent
Wagner et al.

(10) Patent No.: US 12,179,454 B2
(45) Date of Patent: Dec. 31, 2024

(54) DUNNAGE CONVERSION MACHINE AND METHOD WITH ASSISTED TEAR APPARATUS

(71) Applicant: Ranpak Corp., Concord Township, OH (US)

(72) Inventors: Dennis J. Wagner, Painesville, OH (US); Robert C. Cheich, Independence, OH (US); Brian J. Stinard, Wickliffe, OH (US)

(73) Assignee: Ranpak Corp., Concord Township, OH (US)

( * ) Notice: Subject to any disclaimer, the term of this patent is extended or adjusted under 35 U.S.C. 154(b) by 93 days.

(21) Appl. No.: 18/252,126

(22) PCT Filed: Nov. 11, 2021

(86) PCT No.: PCT/US2021/072356
§ 371 (c)(1),
(2) Date: May 8, 2023

(87) PCT Pub. No.: WO2022/104355
PCT Pub. Date: May 19, 2022

(65) Prior Publication Data

US 2024/0001638 A1 Jan. 4, 2024

Related U.S. Application Data

(60) Provisional application No. 63/113,227, filed on Nov. 13, 2020.

(51) Int. Cl.
*B31D 5/00* (2017.01)

(52) U.S. Cl.
CPC .... *B31D 5/0047* (2013.01); *B31D 2205/0047* (2013.01); *B31D 2205/0082* (2013.01); *B31D 2205/0088* (2013.01)

(58) Field of Classification Search
CPC .......... B31D 5/0047; B31D 2205/0047; B31D 2205/0082
See application file for complete search history.

(56) References Cited

U.S. PATENT DOCUMENTS 4,101,627 A * 7/1978 Menier ................ B31D 5/0082 264/320
5,211,620 A * 5/1993 Ratzel .................. B31D 5/0047 493/464

(Continued)

FOREIGN PATENT DOCUMENTS

EP 2474412 A2 * 7/2012 ........... B31D 5/0073
JP 2005534539 A 11/2005

(Continued)

OTHER PUBLICATIONS

International Search Report and Written Opinion mailed Feb. 23, 2022, for priority International Application No. PCT/US2021/072356.

*Primary Examiner* — Lucas E. A. Palmer
(74) *Attorney, Agent, or Firm* — Renner, Otto, Boisselle & Sklar, LLP

(57) ABSTRACT

A dunnage conversion machine includes a forming assembly configured to form a sheet stock material into a strip of dunnage, and a feeding assembly downstream of the forming assembly that is configured to pull the sheet stock material through the forming assembly. The machine also includes a tear assist assembly downstream of the feeding assembly that includes a pinch arm on one side of the path and a stop opposing the pinch arm on an opposite side of the path. The pinch arm is movable between a resting position in which the pinch arm is located on the one side of the path, and a pinching position in which the pinch arm is located in the path to capture the strip of dunnage between the pinch arm and the stop. Reversing the feed assembly while the (Continued)

pinch arm is in the pinching position causes the strip of dunnage to tear.

18 Claims, 8 Drawing Sheets

(56) References Cited

U.S. PATENT DOCUMENTS

| | | | | |
|---|---|---|---|---|
| 6,033,353 | A * | 3/2000 | Lencoski | B31D 5/0047 493/464 |
| 7,347,809 | B2 * | 3/2008 | Toth | B31D 5/0052 493/464 |
| 7,479,100 | B2 * | 1/2009 | Toth | B65H 23/08 493/464 |
| 2013/0092716 | A1 * | 4/2013 | Wetsch | A47K 10/32 225/77 |
| 2014/0038805 | A1 * | 2/2014 | Wetsch | B31D 5/0043 493/464 |
| 2014/0274645 | A1 * | 9/2014 | Wetsch | B65H 35/04 493/360 |
| 2014/0274647 | A1 * | 9/2014 | Wetsch | B31D 5/0043 493/464 |
| 2017/0095991 | A1 * | 4/2017 | Wetsch | B31D 5/0039 |
| 2018/0326688 | A1 * | 11/2018 | Wetsch | B31D 5/0052 |
| 2023/0219778 | A1 * | 7/2023 | Schalk | B65H 18/10 242/529 |

FOREIGN PATENT DOCUMENTS

| | | | | |
|---|---|---|---|---|
| WO | 2005/007394 | A2 | 1/2005 | |
| WO | 2017/059348 | A1 | 4/2017 | |
| WO | 2019/023035 | A1 | 1/2019 | |
| WO | WO-2020205193 | A1 * | 10/2020 | B31D 5/0043 |

* cited by examiner

DUNNAGE CONVERSION MACHINE AND METHOD WITH ASSISTED TEAR APPARATUS

This application is a national phase of International Patent Application No. PCT/US2021/072356, filed Nov. 11, 2021, which claims priority to U.S. Provisional Patent Application No. 63/113,227, filed Nov. 13, 2020, each of which is hereby incorporated herein by reference in its entirety.

FIELD OF THE INVENTION

The present invention relates generally to the field of dunnage conversion systems, and more particularly to a dunnage conversion machine and method with means for separating a formed dunnage product.

BACKGROUND

In the process of packing an article in a packaging container before shipping the article from one location to another, a protective packaging material (dunnage product) is typically placed in the packaging container with the article. The dunnage product is included to fill any voids or to cushion the article during the shipping process. Paper packing material is an ecologically-friendly packing material that is recyclable, biodegradable, and composed of a renewable resource. While paper in sheet form could possibly be used as a protective packaging material, it may be preferable to convert the sheets of paper to a lower-density dunnage product.

Once converted in a dunnage conversion machine, a discrete dunnage product typically is separated from the dunnage conversion machine by a manual pulling process or by a semi-automatic or automatic bladed cutting mechanism in the dunnage conversion machine. Manual tearing becomes difficult when the formed dunnage product includes multiple layers of sheet material connected together. Additionally, manual tearing is difficult when there is no perforation provided in the area that needs to be separated. Semi-automatic and automatic bladed cutting mechanisms typically are large, heavy, and expensive to incorporate into dunnage conversion machines.

SUMMARY

We provide a dunnage conversion machine and method that uses a tear assist assembly to improve on both manual tearing processes and semi-automatic or automatic bladed cutting devices previously used to separate discrete dunnage products from dunnage conversion machines. The dunnage conversion machine according to the present invention includes a forming assembly for forming sheet stock material into a strip of dunnage, a feeding assembly for pulling the sheet stock material from a supply and through the forming assembly, and a tear assist assembly for cooperating with the feeding assembly to create a tear in at least a portion of the strip of dunnage. The tear assist assembly, therefore, assists in the separation of a discrete dunnage product from the strip of dunnage for withdrawal from the dunnage conversion machine without a cutting blade.

Specifically, an exemplary dunnage conversion machine includes a forming assembly that is configured to form a sheet stock material into a strip of dunnage having a lower density than the sheet stock material. The dunnage conversion machine also includes a feeding assembly downstream of the forming assembly that is configured to pull the sheet stock material from a supply, through the forming assembly, and to advance the strip of dunnage along a path in a downstream direction. The dunnage conversion machine also includes a tear assist assembly downstream of the feeding assembly. The tear assist assembly includes a pinch arm on one side of the path and a stop opposing the pinch arm on an opposite side of the path from the pinch arm. The pinch arm is movable between a resting position in which the pinch arm is located on the one side of and out of the path, and a pinching position in which the pinch arm is located in the path to capture the strip of dunnage between the pinch arm and the stop. The dunnage conversion machine also includes a controller configured to control operation of the dunnage conversion machine.

The controller may be configured to operate the feeding assembly in a feeding direction to advance a desired length of the strip of dunnage in the downstream direction and stop the operation of the feeding assembly in the feeding direction after the desired length of the strip of dunnage has been advanced. The controller also may be configured to activate the tear assist assembly to move the pinch arm from the resting position to the pinching position to capture the strip of dunnage between the pinch arm and the stop at a capture point on the strip of dunnage. The controller also may then be configured to operate the feeding assembly in a reverse direction, opposite the feeding direction, to reverse an upstream region of the strip of dunnage upstream of the capture point in an upstream direction to create a tear in the strip of dunnage. The controller then may be configured to stop the operation of the feeding assembly in the reverse direction and deactivate the tear assist assembly to move the pinch arm from the pinching position to the resting position to release the strip of dunnage between the pinch arm and the stop.

The feeding assembly may include a pair of rotating members that cooperate to advance and reverse the strip of dunnage along the path.

The controller may be configured to operate the feeding assembly in a feeding direction for a first predetermined number of rotations of the pair of rotating members to advance a desired length of the strip of dunnage. The controller therefore may also be configured to stop the operation of the feeding assembly in the feeding direction after the pair of rotating members have rotated the first predetermined number of rotations.

The controller may be configured to operate the feeding assembly in a reverse direction for a second predetermined number of rotations of the pair of rotating members to reverse an upstream region of the strip of dunnage upstream of the capture point in an upstream direction to create a tear in the strip of dunnage. The controller therefore may also be configured to stop the operation of the feeding assembly in the reverse direction after the pair of rotating members have rotated the second predetermined number of rotations.

The controller may be configured to operate the feeding assembly in the feeding direction for a first predetermined period of time to advance the desired length of the strip of dunnage. The controller therefore may also be configured to stop the operation of the feeding assembly in the feeding direction after the first predetermined period of time has passed.

The controller may be configured to operate the feeding assembly in the reverse direction for a second predetermined period of time to reverse the upstream region of the strip of dunnage in the upstream direction and create a tear in the strip of dunnage. The controller therefore may also be configured to stop the operation of the feeding assembly in the reverse direction after the second predetermined period of time has passed.

The dunnage conversion machine may additionally include a dunnage production sensor configured to detect a length of the strip of dunnage that has been advanced in the downstream direction.

The tear assist assembly may include a motive device operatively coupled to the pinch arm and configured to move the pinch arm between the resting position and the pinching position.

The controller may be configured to activate the tear assist assembly to move the pinch arm from the resting position to the pinching position by sending a capture signal to the motive device after stopping the operation of the feeding assembly in the feeding direction. The controller also may be configured to deactivate the tear assist assembly to move the pinch arm from the pinching position to the resting position by sending a release signal to the motive device after stopping the operation of the feeding assembly in the reverse direction.

The motive device may include an electric motor.

The feeding assembly may be configured to connect two or more plies of the strip of dunnage advancing therebetween to form a connected portion of the strip of dunnage.

The tear assist assembly may be configured to capture at least the connected portion of the strip of dunnage such that the tear is created at least in the connected portion of the strip of dunnage.

An exemplary method for making a discrete dunnage product in a dunnage conversion machine may include a step of forming a sheet stock material into a strip of dunnage having a lower density than the sheet stock material and a step of advancing a desired length of the strip of dunnage in a downstream direction along a path of the dunnage conversion machine. The method may include a step of capturing the strip of dunnage at a capture point. The method may then include a step of reversing an upstream region of the strip of dunnage in an upstream direction, opposite the downstream direction, to create a tear in the upstream region of the strip of dunnage to at least partially separate the discrete dunnage product from the strip of dunnage. The upstream region is upstream of the capture point. The method then includes a step of releasing the strip of dunnage at the capture point. The dunnage conversion machine includes a tear assist assembly including a pinch arm on one side of the path and a stop opposing the pinch arm on an opposite side of the path from the pinch arm. The steps of capturing and releasing therefore include moving the pinch arm between a resting position in which the pinch arm is located on the one side of the path, and a pinching position in which the pinch arm is located in the path.

The step of advancing may include rotating a pair of rotating members in a feeding direction for a first predetermined number of rotations. The pair of rotating members rotating in the feeding direction cooperate to advance the strip of dunnage in the downstream direction.

The step of reversing may include rotating a pair of rotating members in a reverse direction for a second predetermined number of rotations. The pair of rotating members rotating in the reverse direction cooperate to reverse the strip of dunnage in the upstream direction.

The step of advancing may occur for a first predetermined period of time.

The step of reversing may occur for a second predetermined period of time.

The step of capturing may include activating the tear assist assembly to move the pinch arm from the resting position to the pinching position to capture the strip of dunnage between the pinch arm and the stop at the capture point.

The step of releasing may include deactivating the tear assist assembly to move the pinch arm from the pinching position to the resting position.

DETAILED DESCRIPTION

We will now describe in detail a dunnage conversion machine and method that uses a tear assist assembly to improve on both manual tearing processes and semi-automatic or automatic bladed cutting devices previously used to separate discrete dunnage products. The tear assist assembly cooperates with a feeding assembly in the dunnage conversion machine to create a tear in at least a portion of a strip of dunnage formed in the dunnage conversion machine, without the use of a bladed cutting device. Our tear assist assembly, therefore, allows for easy manual separation and withdrawal of a discrete dunnage product from the dunnage conversion machine.

Figure 1:
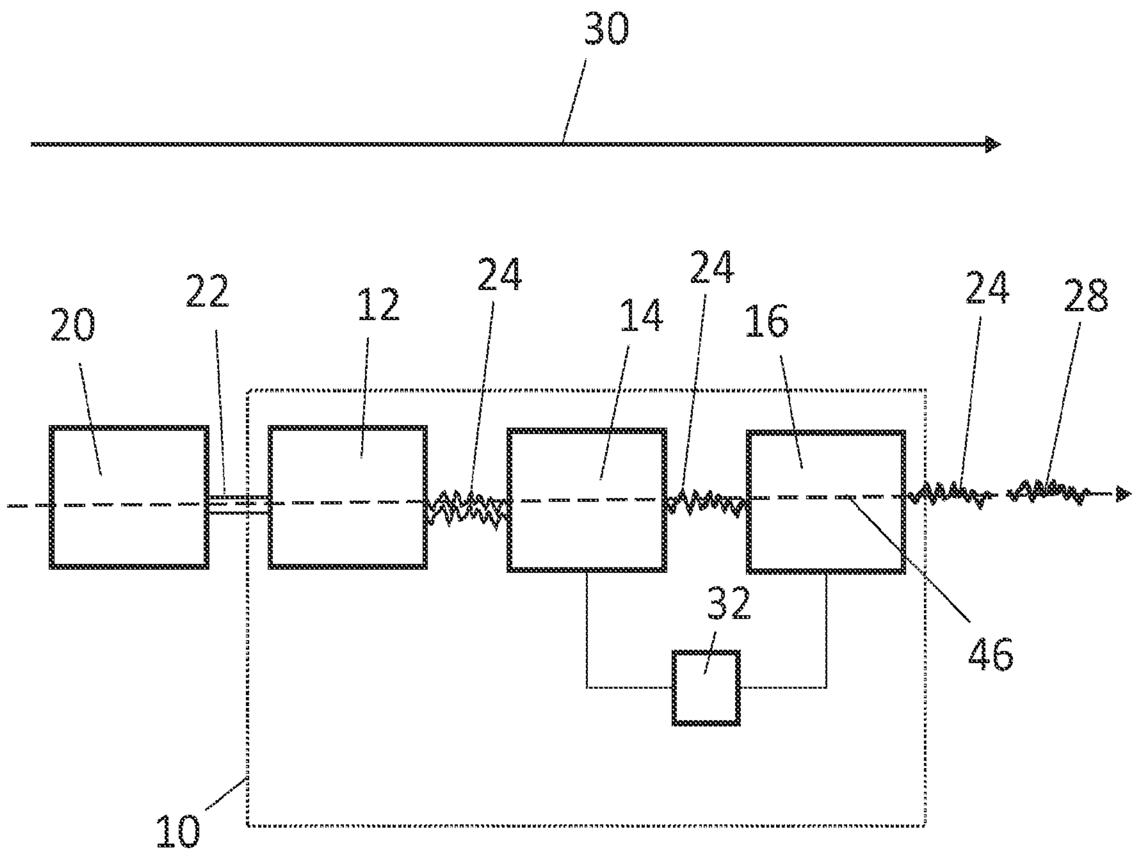
FIG. 1 is a schematic diagram of a dunnage conversion system.

FIG. 1 shows a schematic dunnage conversion machine 10 with a forming assembly 12 and a feeding assembly 14 that cooperate to draw a sheet stock material 22 from a supply 20 of sheet stock material and to convert the sheet stock material 22 into a strip of dunnage 24 as it travels through the dunnage conversion machine 10 in a downstream direction 30. The dunnage conversion machine 10 additionally includes a tear assist assembly 16, downstream of the feeding assembly 14, that is configured to assist in separating a discrete dunnage product 28 from the substantially continuous strip of dunnage 24 formed by the dunnage conversion machine 10 without a cutting blade. The dunnage conversion machine 10 includes a controller 32 for controlling the operation of the dunnage conversion machine 10.

The supply 20 of sheet stock material 22 may include, for example, one or more plies of sheet stock material 22 supplied as a roll or a fan-folded stack. Multiple rolls or stacks may be used to provide multiple plies of sheet stock material 22 for conversion. Paper is an environmentally responsible choice for the sheet stock material 22 because paper generally is recyclable, reusable, and composed of a renewable resource. Therefore, an exemplary sheet stock material 22 for use in the dunnage conversion machine 10 includes either a single ply or a multi-ply kraft paper provided in either roll form or a series of connected rectangular pages in a fan-folded stack. Subsequent rolls or stacks may be spliced to trailing ends of preceding rolls or stacks to provide a continuous length of sheet stock material 22 to the dunnage conversion machine 10.

The forming assembly 12, through which the sheet stock material 22 is pulled in the downstream direction 30, is configured to convert the relatively planar sheet stock material 22 into a strip of dunnage 24 that has a three-dimensional shape with a smaller width dimension, a larger thickness dimension, and a lower density than the sheet stock material 22. For example, the forming assembly 12 may be configured to shape and randomly crumple at least a portion of the sheet stock material 22. The forming assembly 12 may include a converging shaping chute and a forming member, such as a forming frame, that extends into the converging shaping chute for shaping the relatively planar sheet stock material 22 into the strip of dunnage 24. Specifically, the relatively planar sheet stock material 22 may be fed into the forming member between the converging shaping chute and the forming member such that side edges of the sheet stock material 22 are turned inwardly towards one another around the forming frame. When turned inwardly, the sheet stock material 22 may randomly crumple and the side edges of the sheet stock material 22 may come together such that multiple layers overlap each other. The forming assembly is not limited to the described forming assembly 12, however, but may be of any other type suitable for forming the relatively planar sheet stock material 22 into the strip of dunnage 24 having a three-dimensional shape with lower density than the sheet stock material 22.

The feeding assembly 14 is located downstream of the forming assembly 12 in the dunnage conversion machine 10 and is configured to perform at least one, and generally two functions in the operation of the dunnage conversion machine 10. One function is a feeding function. To perform the feeding function, the feeding assembly 14 is configured to pull the sheet stock material 22 from the supply 20 and through the forming assembly 12, pulling the strip of dunnage 24 from the forming assembly 12. In doing so, the feeding assembly 14 is also configured to feed the continuous sheet stock material 22 from the supply 20 of sheet stock material through the forming assembly 12 in the downstream direction 30.

Another function of the feeding assembly 14 may be a connecting function. To perform the connecting function, the feeding assembly 14 may be configured to connect together at least a portion of overlapping layers of the two or more plies, such as the overlapping side edges, in the strip of dunnage 24 drawn from the forming assembly 12 to form a connected strip of dunnage 24 downstream of the feeding assembly 14. The portion of the strip of dunnage 24 in which the two or more plies, or the overlapping layers, are connected is referred to herein as a connected portion of the connected strip of dunnage 24.

The feeding assembly 14 is configured to advance the strip of dunnage 24 along the path 46 of the dunnage conversion machine 10 to the tear assist assembly 16 located downstream of the feeding assembly 14. The tear assist assembly 16 is configured to cooperate with the feeding assembly 14 to at least partially tear, or otherwise separate, at least a portion of the strip of dunnage 24 to assist in separating a discrete dunnage product 28 of a desired length from the substantially continuous strip of dunnage 24. Specifically, the tear assist assembly 16 is configured to capture the strip of dunnage 24 at a capture point on the strip of dunnage 24. Once the strip of dunnage 24 is captured, the feeding assembly 14 operates in reverse to at least partially tear, or otherwise separate, at least a portion of the strip of dunnage 24 upstream of the capture point. The capture point may be at least in the connected portion of the connected strip of dunnage 24 such that the tear is created at least in the connected portion of the connected strip of dunnage 24.

The controller 32 is configured to control the operation of the dunnage conversion machine 10 and each of its component parts. The controller 32 may include a processor, a memory, and a program stored in the memory. The controller 32 may additionally include one or more input devices, such as for determining the desired length of the strip of dunnage 24, and one or more outputs, including outputs for controlling elements of the dunnage conversion machine 10. The input devices can be connected to or include one or more of a keyboard, a mouse, a touch screen display, a scanner or sensor, a bar code reader, a radio frequency identification device (RFID) sensor, a microphone, a camera, etc. The controller 32 can be programmed to recognize the appropriate inputs that represent a desired length of the strip of dunnage 24, or identify a location to look up one or multiple lengths needed for a particular packing container.

Figure 2:
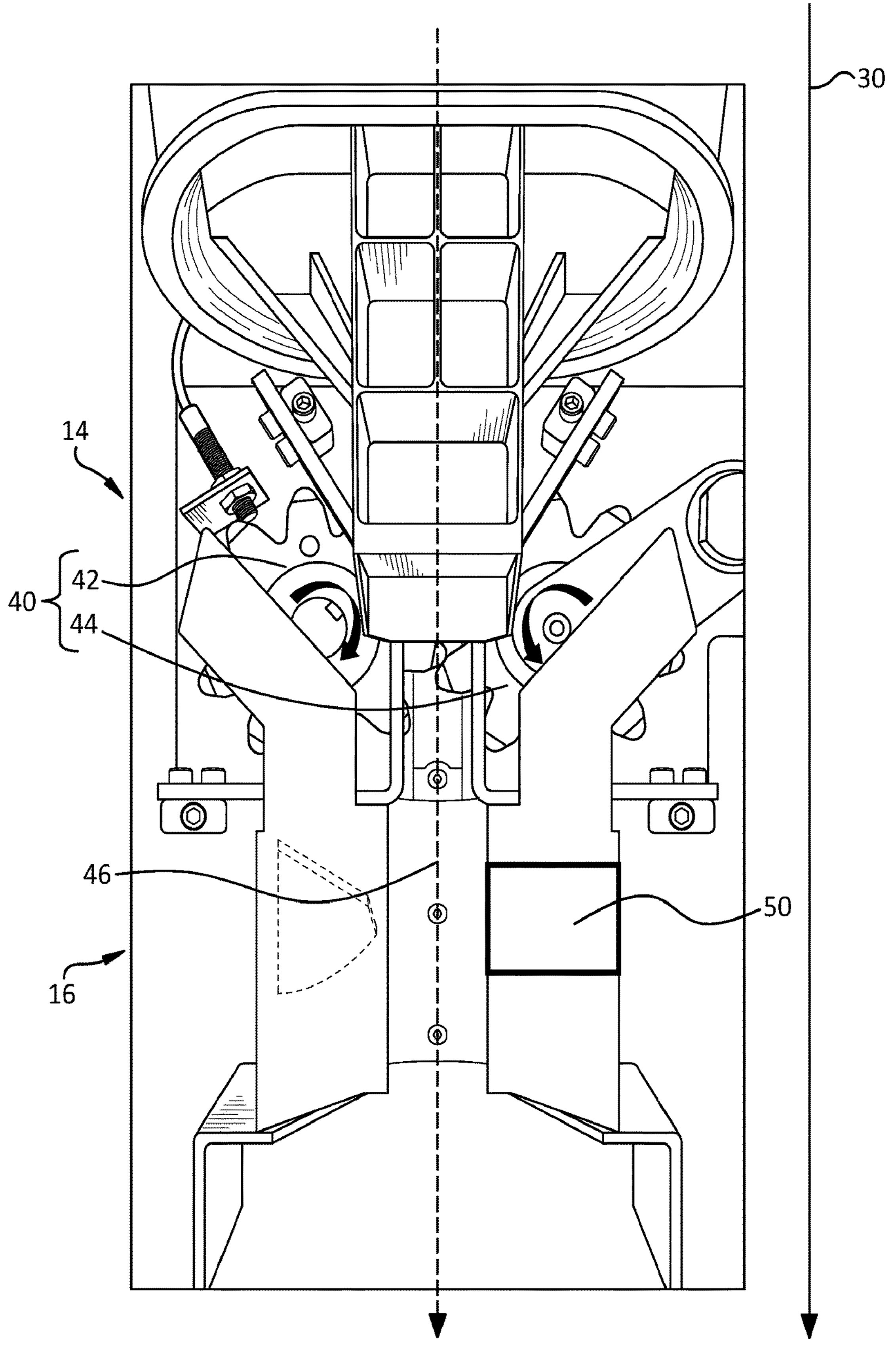
FIG. 2 is a perspective view of a dunnage conversion machine with a tear assist assembly having a pinch arm in a resting position.
Figure 3:
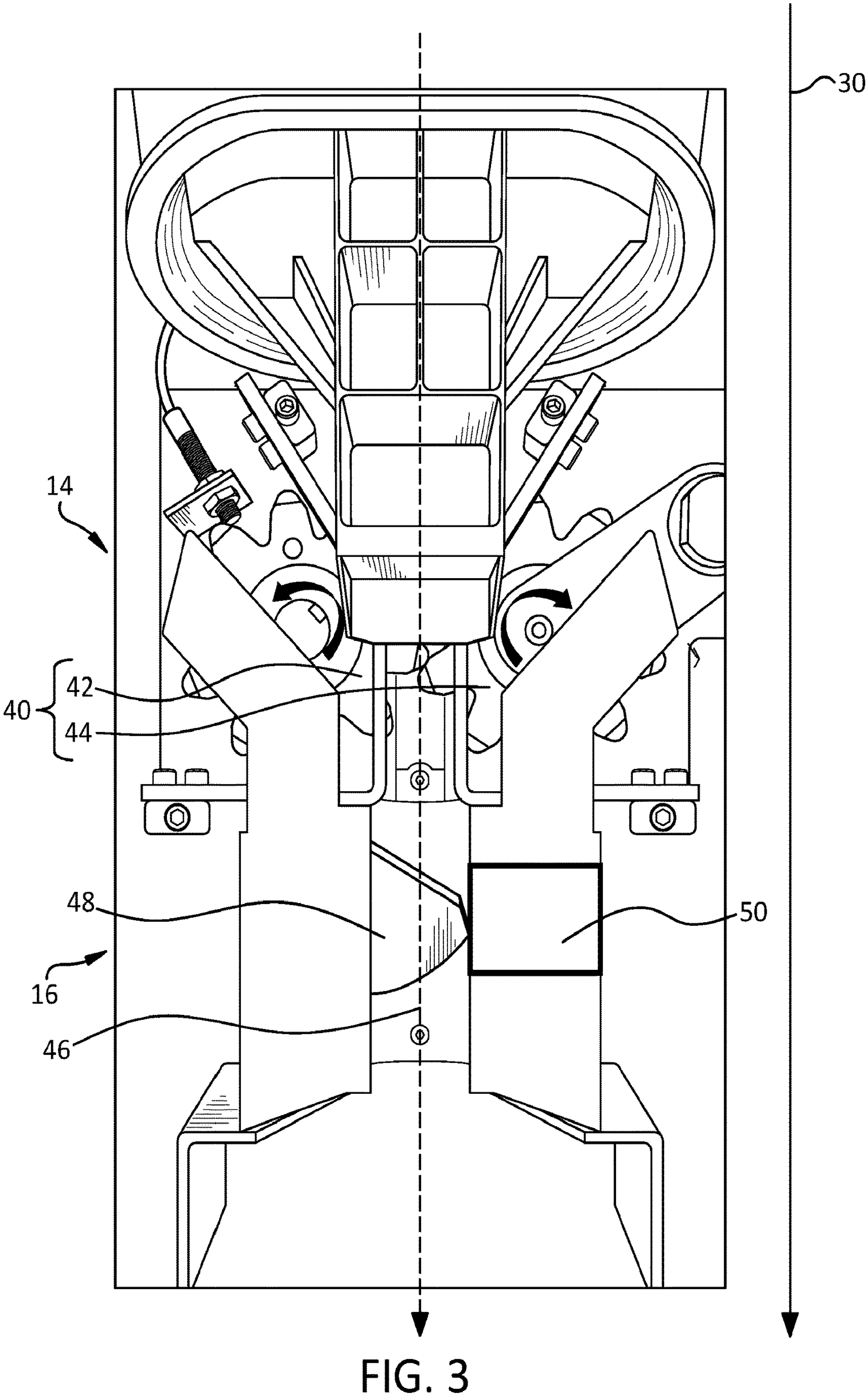
FIG. 3 is a perspective view of the dunnage conversion machine of FIG. 2 with the tear assist assembly having the pinch arm in a pinching position.

With reference to FIGS. 2 and 3, an exemplary feeding assembly 14 and an exemplary tear assist assembly 16 will now be described in more detail. Whether the feeding assembly 14 has one or both of the feeding function and the connecting function, the exemplary feeding assembly 14 includes a pair of rotating members 40. The pair of rotating members 40 include a first rotating member 42 and a second rotating member 44 which are spaced across a path 46 of the dunnage conversion machine 10 by which the strip of dunnage 24 travels. The pair of rotating members cooperate to advance the strip of dunnage 24 down the path 46 in the downstream direction 30. To perform the feeding function, the pair of rotating members 40 progressively engage the strip of dunnage 24 on opposite transverse sides thereof to pull the strip of dunnage 24 through the forming assembly 12 and, in turn, pull the sheet stock material 22 from the supply of sheet stock material 20 and into the forming assembly 12. The first rotating member 42 and the second rotating member 44 each have a surface that provides sufficient friction to grip the strip of dunnage 24, and may be knurled or have a rubber or other high-friction surface, for example, to provide the desired grip on the sheet stock material 22. The first rotating member 42 and the second rotating member 44 preferably, but not necessarily, are biased against one another to maintain a grip on the strip of dunnage 24 passing therebetween.

To perform the connecting function, the pair of rotating members 40 may be configured to deform the strip of dunnage 24 on opposite sides thereof to form the connected portion of the connected strip of dunnage 24. Specifically, the first rotating member 42 and the second rotating member 44 alternatively may be formed by a pair of intermeshing gears that crimp the layers of sheet stock material 22 passing therebetween, or may cut the sheet stock material 22 to form one or more tabs displaced from the plane of adjacent portions of the sheet stock material 22 to hold the connected strip of dunnage in its three-dimensional shape. For example, the first rotating member 42 and the second rotating member 44 may each have interlaced teeth for deforming the strip of dunnage 24 passing therebetween. By deforming the strip of dunnage 24, the interlaced teeth thereby mechanically interlock the plies or overlapping layers of sheet stock material 22 in the strip of dunnage 24 along lines of connection to hold them together in the connected strip of dunnage 24. This mechanical connection is distinguished from a chemical or adhesive bond between the plies or overlapping layers. The first rotating member 42 and the second rotating member 44 may be configured to additionally flatten, crease, emboss, cut, or punch or otherwise deform the sheet stock material 22 as it passes therebetween.

The tear assist assembly 16 includes a pinch arm 48 on one side of the path 46 and a stop 50 on an opposite side of the path 46. The stop 50 opposes the pinch arm 48 and provides a surface against which the inch arm 48 can capture the strip of dunnage 24. The stop 50 may include a plate or another pinch arm positioned on the opposite side of the path 46 from the pinch arm 48. The stop 50 may be formed as a part of a chute that defines the path 46 from an inlet adjacent the feeding assembly to an outlet downstream of the tear assist assembly.

The pinch am 48 is moveable between a resting position (FIG. 2) and a pinching position (FIG. 3). In the resting position (FIG. 2), the pinch arm 48 is located on the one side of the path 46 opposite and apart from the stop 50 and out of the path 46 so as not to impede the progress of the strip of dunnage passing thereby. Therefore, in the resting position of the pinch arm 48 (FIG. 2), the strip of dunnage 24 is able to freely pass between the pinch arm 48 and the stop 50 as it is advanced along the path 46 in the downstream direction 30 by the feeding assembly 14. In the pinching position (FIG. 3), the pinch arm 48 is located in the path 46 to capture the strip of dunnage 24 passing therethrough between the pinch arm 48 and the stop 50. Therefore, in the pinching position (FIG. 3), the strip of dunnage 24 can no longer freely pass between the pinch arm 48 and the stop 50, as it is captured and held therebetween at the capture point.

If the strip of dunnage 24 includes a line of connection, in which multiple layers of sheet stock material 22 are connected, the pinch arm 48 and the stop 50 preferably are positioned to engage the strip of dunnage 24 at the line of connection. If the strip of dunnage 24 includes multiple lines of connection, the tear assist assembly 16 may include multiple pinch arm 48 and stop 50 pairs positioned to engage respective lines of connection.

The pinch arm 48 may be pivotably or rotatably mounted in the dunnage conversion machine 10 such that the pinch arm 48 pivots or rotates between the resting position and the pinching position. Alternatively, the pinch arm 48 may be mounted in the dunnage conversion machine 10 such that the pinch arm 48 moves linearly between the resting position and the pinching position. Movement of the pinch arm 48 is powered by a motive device in at least one direction of motion. The pinch arm 48 may be biased to the resting position with a spring and may be actively moved to the pinching position by a motive device 58, the operation of which will be described more fully below with reference to FIG. 8.

Figure 4:
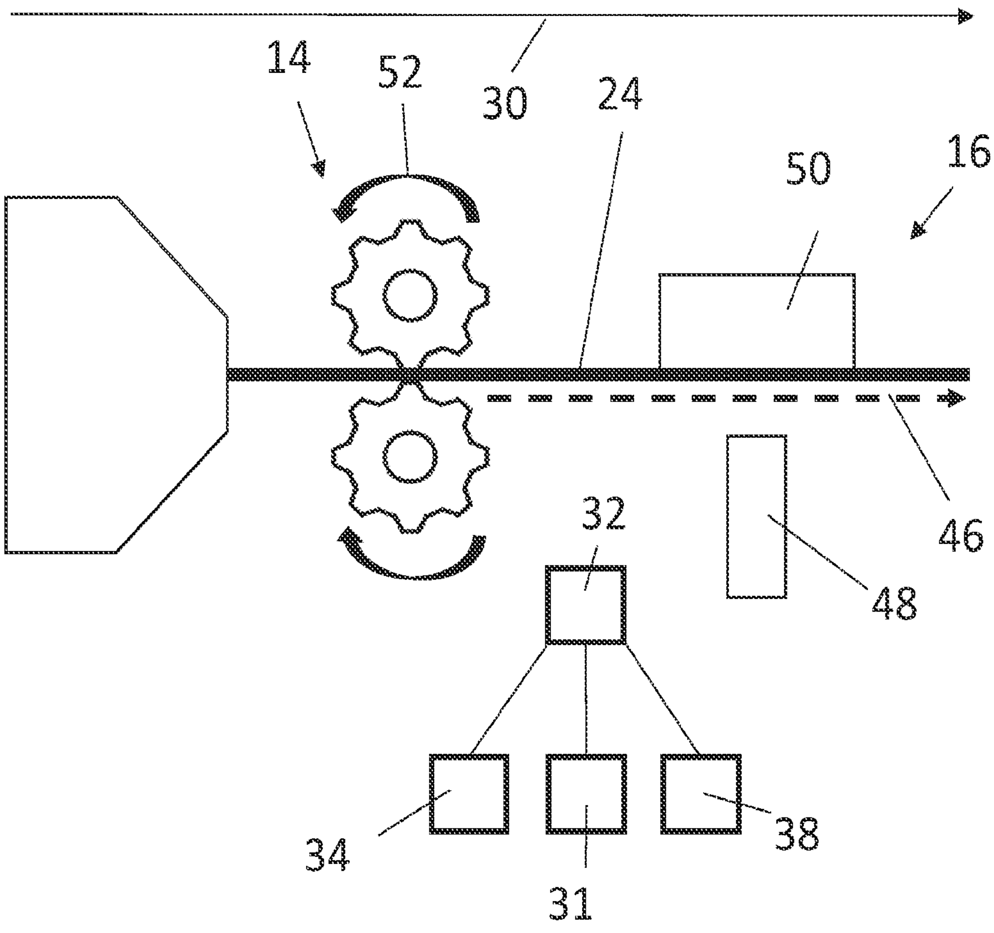
FIGS. 4-7 are sequential schematic illustrations of the operation of the dunnage conversion machine, in particular the tear assist assembly, of FIG. 1.

With reference to FIGS. 4 to 7, the cooperation of the feeding assembly 14 and the tear assist assembly 16 to at least partially tear, or otherwise separate, at least a portion of the strip of dunnage 24 will now be described. As depicted in FIG. 4, the controller 32 generally is configured to operate the feeding assembly 14 in a feeding direction 52 to advance the desired length of the strip of dunnage 24 along the path 46 in the downstream direction 30. The dunnage conversion machine 10 may include a dunnage production sensor 34 for detecting a length of the strip of dunnage 24 that has been advanced. The dunnage production sensor 34 is coupled to the controller 32 and may be separate or integrated into the controller 32. Once the desired length of the strip of dunnage 24 has been advanced, the controller 32 is configured to stop the operation of the feeding assembly 14 in the feeding direction 52.

The controller 32 may be configured to operate the feeding assembly 14 in the feeding direction 52 for a first predetermined period of time. In this embodiment, the dunnage conversion machine 10 includes a timer 38 for determining a period of time that has passed. The timer 38 is coupled to the controller 32 and may be separate or integrated into the controller 32. The first predetermined period of time, for example, may be chosen to be sufficient for advancing the desired length of the strip of dunnage 24. After the first predetermined period of time has passed, the controller 32 is configured to stop the operation of the feeding assembly 14 in the feeding direction 52.

Alternatively, the controller 32 may be configured to operate the feeding assembly 14 in the feeding direction 52 for a first predetermined number of rotations of the pair of rotating members 40. In this embodiment, the dunnage conversion machine 10 may include a rotation counter 31 for determining the number of rotations that the pair of rotating members 40 have rotated. The rotating counter 31 is coupled to the controller 32 and may be separate or integrated into the controller 32. The first predetermined number of rotations, for example, may be chosen to be sufficient for advancing the desired length of the strip of dunnage 24. After the pair of rotating members 40 have rotated the first predetermined number of rotations, the controller 32 is configured to stop the operation of the feeding assembly 14 in the feeding direction 52.

Figure 5:
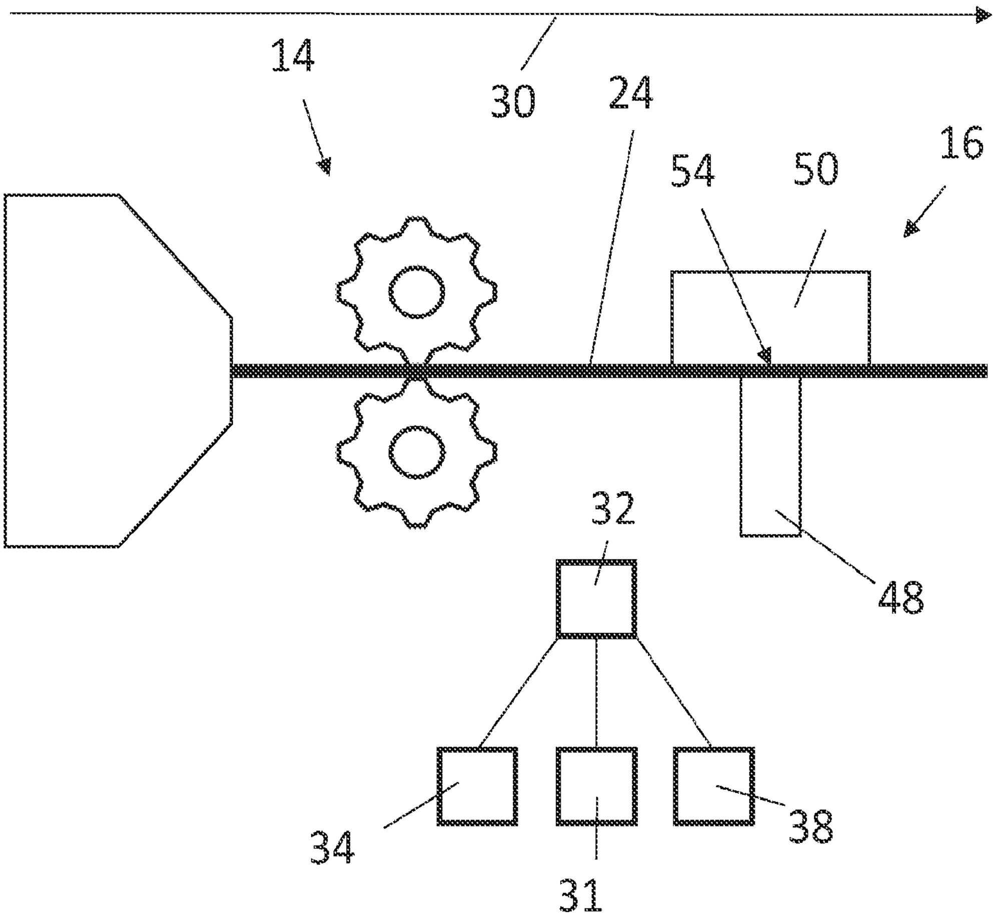

As depicted in FIG. 5 after the desired length of the strip of dunnage 24 has been advanced, the controller 32 is configured to stop the operation of the feeding assembly 14 in the feeding direction 52, as previously described. The conversion machine 32 is then configured to activate the tear assist assembly 16 to move the pinch arm 48 from the resting position (FIGS. 2 and 4) to the pinching position (FIGS. 3 and 5) to capture the strip of dunnage 24 between the pinch arm 48 and the stop at the capture point 54.

Figure 6:
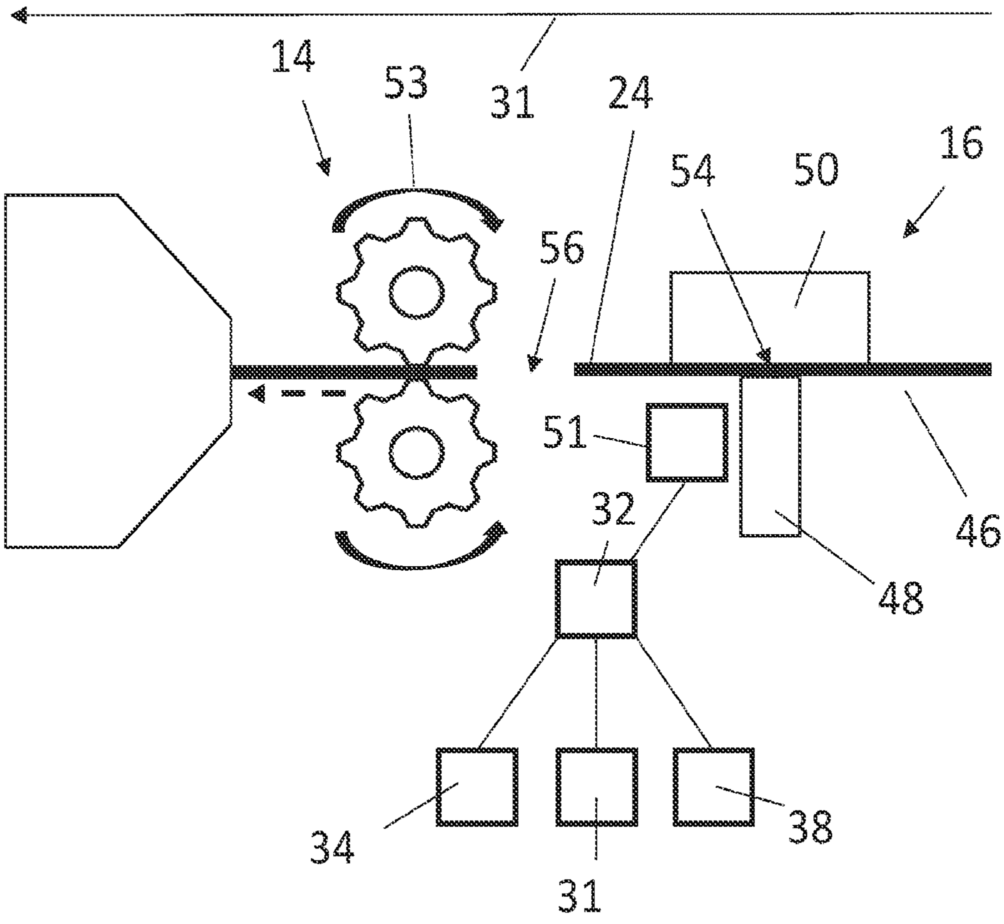

Moving on to FIG. 6, once the tear assist assembly 16 has been activated to capture the strip of dunnage 24 between the pinch arm 48 and the stop 50, the controller 32 is configured to operate the feeding assembly 14 in a reverse direction 53, opposite the feeding direction 52. The dunnage conversion machine 10 may include a pinch arm activation sensor 51 for detecting that the pinch arm 48 is in the pinching position. When the pinch arm activation sensor 51 detects that the pinch arm 48 is in the pinching position, the controller 32 directs the feeding assembly 14 to operate in the reverse direction 53. In this way, the controller 32 is configured to operate the feeding assembly 14 in the reverse direction 53 only when the pinch arm 48 is in the pinching position.

The controller 32 is configured to operate the feeding assembly 14 in the reverse direction 53 to at least partially tear, or otherwise separate, at least a portion of the strip of dunnage 24. For example, the feeding assembly 14, operating in the reverse direction 53 while the strip of dunnage 24 is captured between the pinch arm 48 and the stop 50 at the capture point 54, pulls an upstream portion of the strip of dunnage 24 (i.e., a portion of the strip of dunnage 24 upstream of the capture point 54) in the upstream direction 31, opposite the downstream direction 30. This causes a tear 56 to be created in the strip of dunnage 24 in the upstream portion of the strip of dunnage 24. In the embodiment in which the strip of dunnage 24 includes a connected portion, the capture point 54 preferably is at least in the connected portion such that the tear 56 is created at least in the connected portion, where manually completing separation of a dunnage product from the strip of dunnage 24 may be more difficult. The tear 56 is at least a partial tear.

The controller 32 may be configured to operate the feeding assembly 14 in the reverse direction 53 for a second predetermined period of time using the timer 38. The second predetermined period of time may be chosen to be sufficient for reversing the strip of dunnage 24 enough to create the tear 56 in the strip of dunnage 24. After the second predetermined period of time has passed, the controller 32 is configured to stop the operation of the feeding assembly 14 in the reverse direction 53.

Alternatively, the controller 32 may be configured to operate the feeding assembly 14 in the reverse direction 53 for a second predetermined number of rotations of the pair of rotating members 40. The second predetermined number of rotations, for example, may be chosen to be sufficient for reversing the strip of dunnage 24 enough to create the tear 56 in the strip of dunnage 24. After the pair of rotating members have rotated the second predetermined number of rotations, the controller 32 is configured to stop the operation of the feeding assembly 14 in the reverse direction 53.

Figure 7:
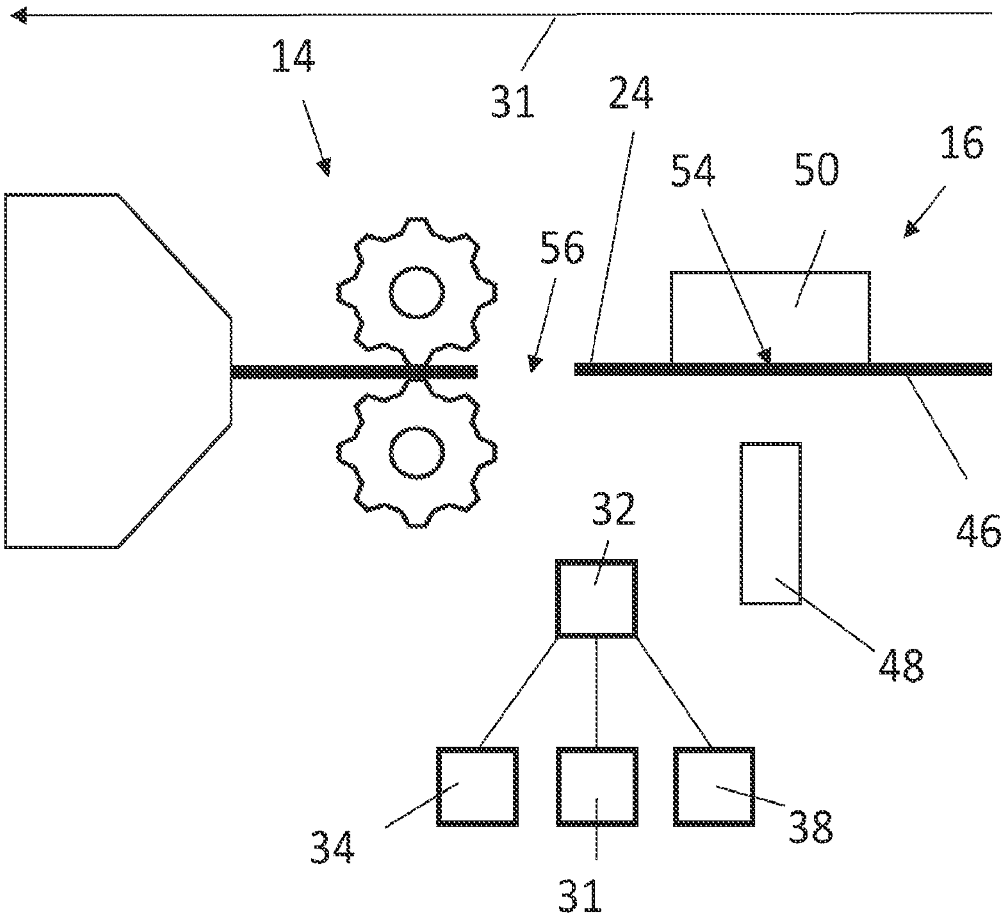

As depicted in FIG. 7, after the tear 56 has been created, the controller 32 is configured to stop the operation of the feeding assembly 14 in the reverse direction 53, as previously described. The conversion machine 32 is then configured to deactivate the tear assist assembly 16 to move the pinch arm 48 from the pinching position (FIGS. 3, 5 and 6) to the resting position (FIGS. 2, 4, and 7) to release the strip of dunnage 24 between the pinch arm 48 and the stop 50.

Figure 8:
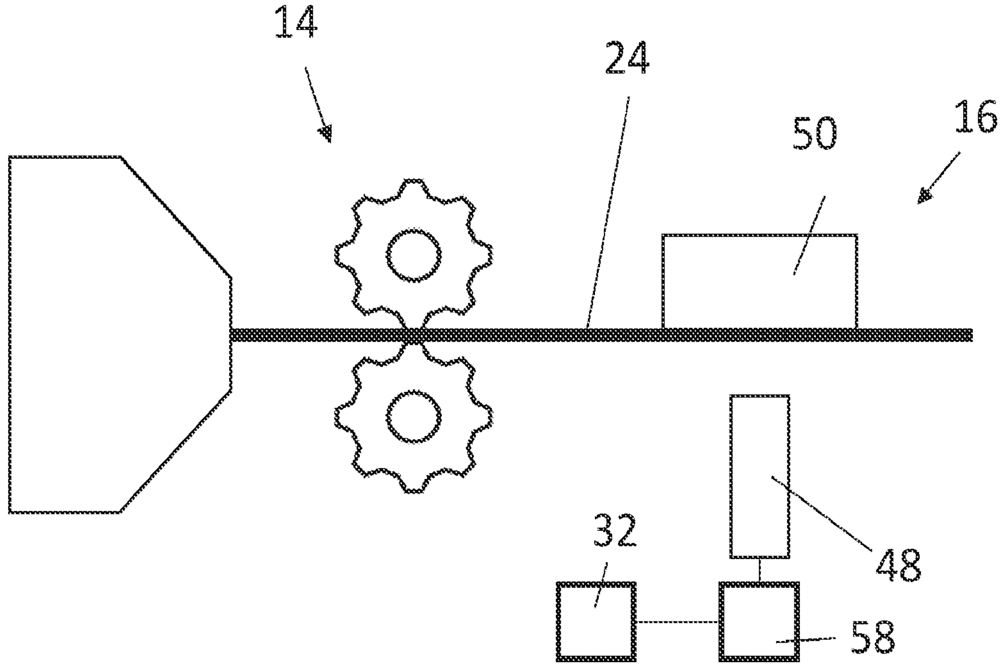
FIG. 8 is a schematic diagram of an embodiment of the tear assist assembly of FIGS. 4-7.

With reference to FIG. 8, at least one direction of movement of the pinch arm 48 between the resting position (FIGS. 2, 4, and 7) and the pinching position (FIGS. 3, 5, and 6) is driven by a motive device 58. The motive device 58 may include a low-torque, high speed electric motor, pneumatic motor, hydraulic motor, solenoid, or any other device that can move the pinch arm 48 relative to the stop 50. The motive device 58 can move the pinch arm 48 in both directions, or a spring or other biasing device may be used to move the pinch arm 48 in one direction. The motive device 58 is operatively coupled to the controller 32 and the pinch arm 48 and is configured to move the pinch arm 48 between the resting position (FIGS. 2, 4, and 7) and the pinching position (FIGS. 3, 5, and 6). The controller 32 is configured to activate the tear assist assembly 16 to move the pinch arm 48 from the resting position (FIGS. 2, 4, and 7) to the pinching position (FIGS. 3, 5, and 6) after stopping the operation of the feeding assembly 14 in the feeding direction 52. The controller 32 is configured to deactivate the tear assist assembly 16 to move the pinch arm 48 from the pinching position (FIGS. 3, 5, and 6) to the resting position (FIGS. 2, 4, and 7) after stopping the operation of the feeding assembly 14 in the reverse direction 53.

We will now describe a method for making a discrete dunnage product in a dunnage conversion machine, such as with the dunnage conversion machine 10 and its various components, as previously described herein. The method includes a step of forming a sheet stock material into a strip of dunnage having a lower density than the sheet stock material. The method includes a step of advancing a desired length of the strip of dunnage in a downstream direction along a path of the dunnage conversion machine. The advancing step may stop after the desired length of the strip of dunnage has been advanced.

The method may additionally include a step of detecting that the desired length of the strip of dunnage has been advanced. The advancing step may be stopped after the step of detecting that the desired length of the strip of dunnage has been advanced.

The advancing step may occur for a first predetermined period of time. Accordingly, the method may additionally include a step of detecting that the first predetermined period of time has passed. The step of advancing may then be stopped after the detecting that the first predetermined period of time has passed.

The advancing step may include rotating a pair of rotating members, such as those previously described with reference to FIGS. 2 and 3, in a feeding direction for a first predetermined number of rotations. The pair of rotating members rotating in the feeding direction cooperate to advance the strip of dunnage in the downstream direction. Accordingly, the method may additionally include a step of detecting that the pair of rotating members have rotated in the feeding direction for the first predetermined number of rotations. The advancing step may then be stopped after the detecting that the pair of rotating members have rotated in the feeding direction for the first predetermined number of rotations. The advancing step also may include connecting multiple layers, specifically connecting multiple layers with the rotating members in a connecting portion of the strip of dunnage.

The method additionally includes step of capturing the desired length of the strip of dunnage at a capture point. As previously described, the dunnage conversion machine 10 includes a tear assist assembly 16 (FIG. 3) that includes a pinch arm on one side of the path and a stop opposing the pinch arm on an opposite side of the path from the pinch arm. The step of capturing, therefore, may include a step of activating the tear assist assembly to move the pinch arm from a resting position to a pinching position. As previously described, in the resting position the pinch arm is located on the one side of the path, and in the pinching position the pinch arm is located in the path to capture the desired length of the strip of dunnage between the pinch arm and the stop at the capture point. In one embodiment, the capturing step includes engaging the connecting portion, and perhaps only the connecting portion, to initiate a tear in the connecting portion.

The method then includes a step of reversing an upstream region of the desired length of the strip of dunnage in an upstream direction, opposite the downstream direction after the capturing step. The upstream region of the desired length of the strip of dunnage is upstream of the capture point. The step of reversing creates a tear in the strip of dunnage to at least partially separate the discrete dunnage product from the desired length of the strip of dunnage.

The step of reversing may occur for a second predetermined period of time. Accordingly, the method includes stopping the reversing step after the second predetermined period of time has passed.

Alternatively, the reversing step may include rotating the pair of rotating members in a reverse direction for a second predetermined number of rotations. The pair of rotating members rotating in the reverse direction cooperate to reverse the strip of dunnage in the upstream direction. Accordingly, the method may additionally include a step of detecting that the pair of rotating members have rotated in the reverse direction for the second predetermined number of rotations. The step of reversing may then be stopped after the detecting the second predetermined number of rotations in the reverse direction.

The method also includes a step of releasing the desired length of the strip of dunnage at the capture point after the reversing step. The step of releasing may include a step of deactivating the tear assist assembly to move the pinch arm from the pinching position to the resting position. The method may additionally include a step of separating the discrete dunnage product from the desired length of the strip of dunnage. And the advancing step may be a first advancing step, and the method may further include a second advancing step after the step or releasing the desired length of the strip of dunnage after the reversing step. If the reversing step does not completely separate a discrete dunnage product from the strip of dunnage, the user can manually separate a discrete dunnage product from the strip of dunnage after the reversing step.

The dunnage conversion machine and method of operating the dunnage conversion machine thus includes a tear assist assembly for creating a tear in at least a portion of a strip of dunnage passing therethrough without employing a cutting blade. The tear assist assembly improves on manual tearing processes and bladed cutting devices previously employed in conventional dunnage conversion machines to separate discrete dunnage products therefrom. With the dunnage conversion machine including the tear assist assembly, a strip of dunnage may be formed from a supply of sheet stock material and a discrete dunnage product may be separated from the strip of dunnage without the added expense of a cutting blade. If the strip of dunnage is only partially torn, preferably torn at least in the line of connection, if any, a discrete dunnage product may be easily separated from the strip of dunnage manually.

In summary, an exemplary dunnage conversion machine 10 includes a forming assembly 12 that is configured to form a sheet stock material 22 into a strip of dunnage 24 having a lower density than the sheet stock material 22. The dunnage conversion machine 10 also includes a feeding assembly 14 downstream of the forming assembly 12 that is configured to pull the sheet stock material 22 from a supply 20, through the forming assembly 12, and to advance the strip of dunnage 24 along a path 46 in a downstream direction 30. The dunnage conversion machine 10 also includes a tear assist assembly 16 downstream of the feeding assembly 14. The tear assist assembly 16 includes a pinch arm 48 on one side of the path 46 and a stop 50 opposing the pinch arm 48 on an opposite side of the path 46 from the pinch arm 48. The pinch arm 48 is movable between a resting position in which the pinch arm 48 is located on the one side of and out of the path 46, and a pinching position in which the pinch arm 48 is located in the path 46 to capture the strip of dunnage 24 between the pinch arm 48 and the stop 50. The dunnage conversion machine 10 also includes a controller 32 configured to control operation of the dunnage conversion machine 10. Reversing the feed assembly 14 while the pinch arm 48 is in the pinching position causes the strip of dunnage 24 to tear.

Although the invention defined by the following claims has been shown and described with respect to a certain embodiment, equivalent alternations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

We claim:

1. A dunnage conversion machine, comprising:

a forming assembly that is configured to form a sheet stock material into a strip of dunnage having a lower density than the sheet stock material;

a feeding assembly downstream of the forming assembly that is configured to pull the sheet stock material through the forming assembly and to advance the strip of dunnage along a path in a downstream direction;

a tear assist assembly downstream of the feeding assembly that includes a pinch arm on one side of the path and a stop opposing the pinch arm on an opposite side of the path from the pinch arm, the pinch arm being movable between a resting position in which the pinch arm is located on the one side of the path, and a pinching position in which the pinch arm is located in the path to capture the strip of dunnage between the pinch arm and the stop without cutting the strip of dunnage; and a controller configured to control operation of the dunnage conversion machine;

wherein the controller is configured to:

operate the feeding assembly in a feeding direction to advance a desired length of the strip of dunnage in the downstream direction;

stop the operation of the feeding assembly in the feeding direction after the desired length of the strip of dunnage has been advanced;

activate the tear assist assembly to move the pinch arm from the resting position to the pinching position to capture the strip of dunnage between the pinch arm and the stop at a capture point on the strip of dunnage;

operate the feeding assembly in a reverse direction, opposite the feeding direction, to reverse an upstream region of the strip of dunnage upstream of the capture point in an upstream direction to create a tear in the strip of dunnage;

stop the operation of the feeding assembly in the reverse direction after the tear has been created; and deactivate the tear assist assembly to move the pinch arm from the pinching position to the resting position to release the strip of dunnage between the pinch arm and the stop.

2. The dunnage conversion machine according to claim 1, wherein the feeding assembly includes a pair of rotating members that cooperate to advance and reverse the strip of dunnage along the path.

3. The dunnage conversion machine according to claim 2, wherein the controller is configured to operate the feeding assembly in a feeding direction for a first predetermined number of rotations of the pair of rotating members to advance a desired length of the strip of dunnage, and stop the operation of the feeding assembly in the feeding direction after the pair of rotating members have rotated the first predetermined number of rotations.

4. The dunnage conversion machine according to claim 2, wherein the controller is configured to operate the feeding assembly in a reverse direction for a second predetermined number of rotations of the pair of rotating members to reverse an upstream region of the strip of dunnage upstream of the capture point in an upstream direction to create a tear in the strip of dunnage, and stop the operation of the feeding assembly in the reverse direction after the pair of rotating members have rotated the second predetermined number of rotations.

5. The dunnage conversion machine according to claim 1, wherein the controller is configured to operate the feeding assembly in a feeding direction for a first predetermined period of time to advance a desired length of the strip of dunnage in the downstream direction, and stop the operation of the feeding assembly in the feeding direction after the first predetermined period of time has passed.

6. The dunnage conversion machine according to claim 1, wherein the controller is configured to operate the feeding assembly in the reverse direction for a second predetermined period of time to reverse the upstream region of the strip of dunnage in the upstream direction and create a tear in the strip of dunnage, and stop the operation of the feeding assembly in the reverse direction after the second predetermined period of time has passed.

7. The dunnage conversion machine according to claim 1, further comprising a dunnage production sensor configured to detect a length of the strip of dunnage that has been advanced in the downstream direction.

8. The dunnage conversion machine according to claim 1, wherein the tear assist assembly includes a motive device operatively coupled to the pinch arm and configured to move the pinch arm between the resting position and the pinching position.

9. The dunnage conversion machine according to claim 8, wherein the controller is configured to activate the tear assist assembly to move the pinch arm from the resting position to the pinching position by sending a capture signal to the motive device after stopping the operation of the feeding assembly in the feeding direction, and wherein the controller is configured to deactivate the tear assist assembly to move the pinch arm from the pinching position to the resting position by sending a release signal to the motive device after stopping the operation of the feeding assembly in the reverse direction.

10. The dunnage conversion machine according to claim 1, wherein the feeding assembly is configured to connect two or more plies of the strip of dunnage advancing therebetween to form a connected portion of the strip of dunnage.

11. The dunnage conversion machine according to claim 10, wherein the tear assist assembly is configured to capture at least the connected portion of the strip of dunnage such that the tear is created at least in the connected portion of the strip of dunnage.

12. A method for making a discrete dunnage product in a dunnage conversion machine, the method comprising the following steps:

forming a sheet stock material into a strip of dunnage having a lower density than the sheet stock material;

advancing a desired length of the strip of dunnage in a downstream direction along a path of the dunnage conversion machine;

capturing the strip of dunnage at a capture point without cutting the strip of dunnage; and reversing an upstream region of the strip of dunnage, the upstream region being upstream of the capture point, in an upstream direction, opposite the downstream direction, to create a tear in the upstream region of the strip of dunnage to at least partially separate the discrete dunnage product from the strip of dunnage; and releasing the strip of dunnage at the capture point;

wherein the dunnage conversion machine includes a tear assist assembly including a pinch arm on one side of the path and a stop opposing the pinch arm on an opposite side of the path from the pinch arm; and wherein the steps of capturing and releasing include moving the pinch arm between a resting position in which the pinch arm is located on the one side of the path, and a pinching position in which the pinch arm is located in the path.

13. The method according to claim 12, wherein the advancing includes rotating a pair of rotating members in a feeding direction for a first predetermined number of rotations, wherein the pair of rotating members rotating in the feeding direction cooperate to advance the strip of dunnage in the downstream direction.

14. The method according to claim 12, wherein the reversing includes rotating a pair of rotating members in a reverse direction for a second predetermined number of rotations, wherein the pair of rotating members rotating in the reverse direction cooperate to reverse the strip of dunnage in the upstream direction.

15. The method according to claim 12, wherein the advancing occurs for a first predetermined period of time.

16. The method according to claim 12, wherein the reversing occurs for a second predetermined period of time.

17. The method according to claim 12, wherein the capturing includes activating the tear assist assembly to move the pinch arm from the resting position to the pinching position to capture the strip of dunnage between the pinch arm and the stop at the capture point.

18. The method according to claim 12, wherein the releasing includes deactivating the tear assist assembly to move the pinch arm from the pinching position to the resting position.

* * * * *